C. L. BRUUN.
VEHICLE BRAKING MECHANISM.
APPLICATION FILED JAN. 11, 1916.
1,203,181.
Patented Oct. 31, 1916.
2 SHEETS—SHEET 1.
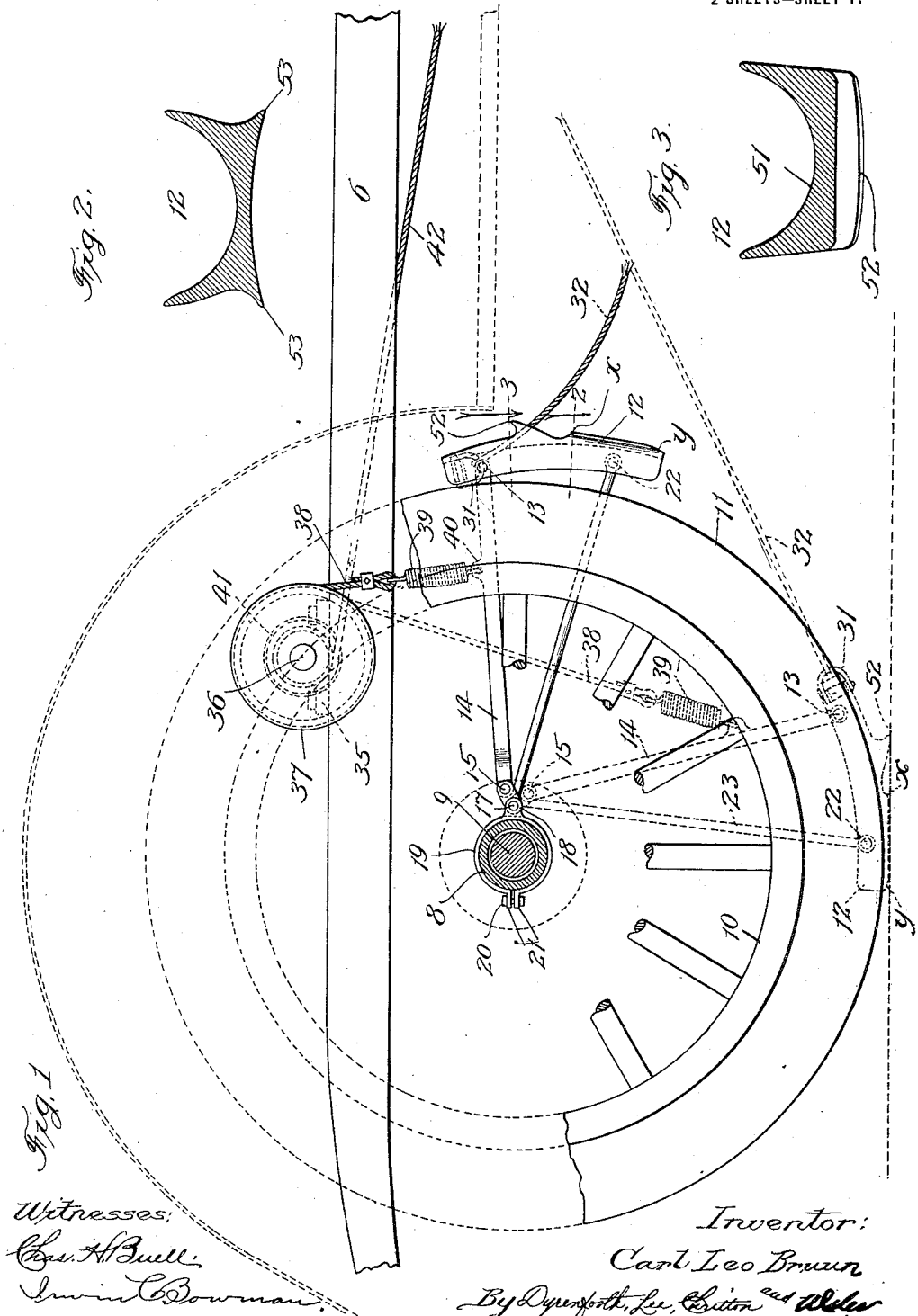

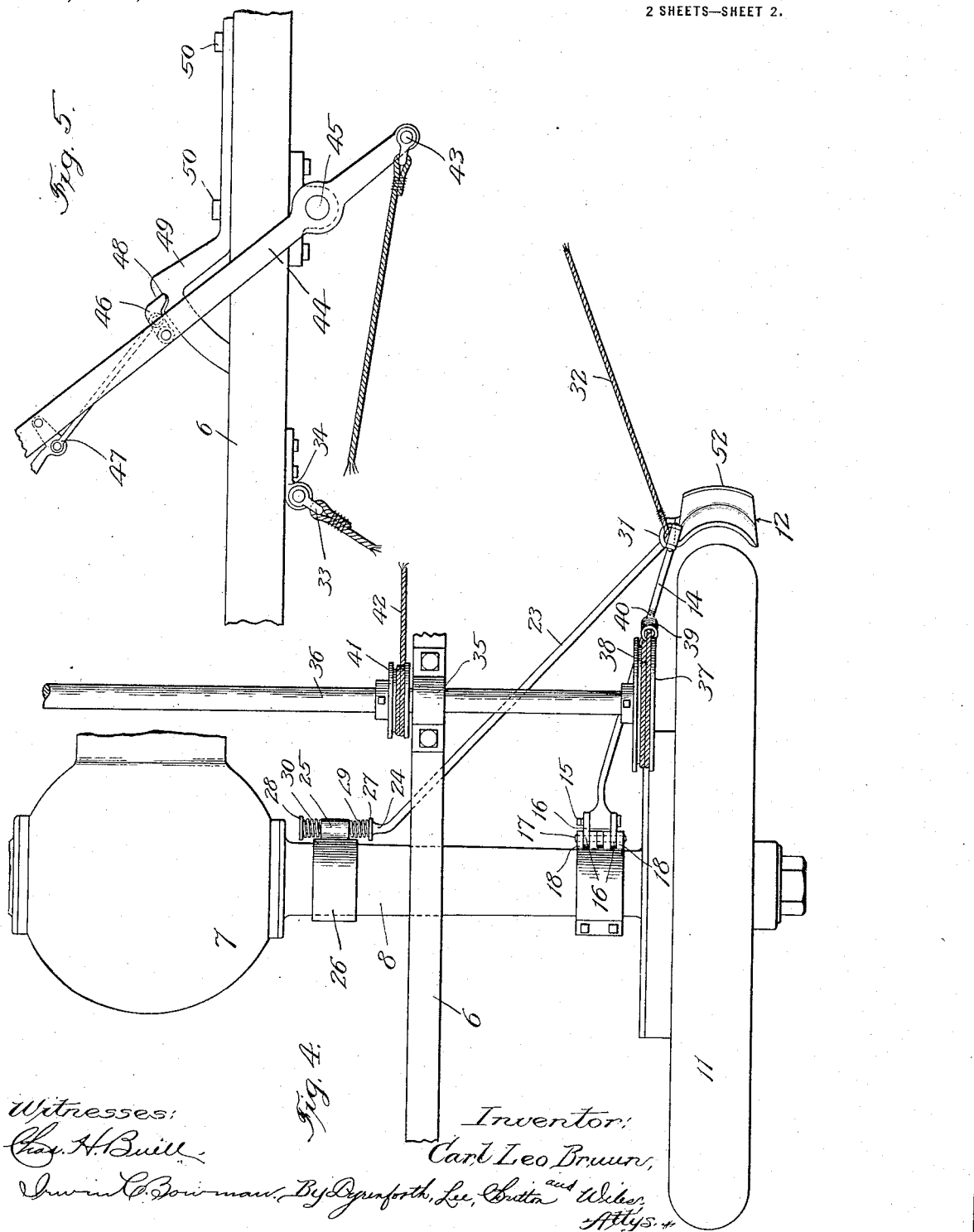

UNITED STATES PATENT OFFICE.

CARL LEO BRUUN, OF CHICAGO, ILLINOIS.

VEHICLE-BRAKING MECHANISM.

1,203,181. Specification of Letters Patent. Patented Oct. 31, 1916.

Application filed January 11, 1916. Serial No. 71,478.

*To all whom it may concern:*

Be it known that I, CARL LEO BRUUN, a citizen of the United States, residing at Chicago, in the county of Cook and State of Illinois, have invented a new and useful Improvement in Vehicle-Braking Mechanism, of which the following is a specification.

My invention relates to vehicle-braking mechanism of the type involving a brake-shoe, so mounted on the vehicle as to be swung from normal raised position, in which it is out of braking position, to lowered position wherein it becomes interposed between the wheel and the ground and in this position brakes the wheel.

My object is to provide improvements in mechanism of the character stated, whereby the mechanism will be simplified, be more positive in action, will prevent skidding of the vehicle, and whereby danger of impairment of the mechanism will be minimized.

Referring to the accompanying drawings, Figure 1 is a view in elevation, partly broken, of the rear portion of an automobile equipped with my improved braking mechanism, the latter being shown by full lines, in normal, raised, position and, by dotted lines, in the position it occupies when performing the braking function. Fig. 2 is an enlarged section taken at the line 2 on Fig. 1, through the brake shoe, and viewed in the direction of the arrow. Fig. 3 is an enlarged section taken at the line 3 on Fig. 1 and viewed in the direction of the arrow. Fig. 4 is a plan view of the structure shown in Fig. 1; and Fig. 5, a view in side elevation of the means for releasably holding the brake shoe in raised position.

I have devised my improved braking means for use more particularly on the wheels of automobiles, and have therefore chosen to illustrate it in connection with a vehicle of this type, though without intending thereby to limit my invention to this particular use.

Only so much of an automobile as is necessary to be shown to clearly illustrate the manner of applying and using my improved mechanism, is represented in the drawing, the braking mechanism being shown as applied to one of the rear wheels of the vehicle, though it will be understood that in practice my improved mechanism would be used on wheels at opposite sides of the vehicle.

A portion of the chassis of the vehicle is represented at 6, the casing for the transmission mechanism at 7, with its sleeve extension 8 surrounding the axle 9, and the wheel at one side of the vehicle and connected with the axle, at 10, the wheel shown being provided with a resilient tire 11 in accordance with common practice. The brake-shoe to be moved into and out of a position in which it becomes interposed between the tire 11 and the ground over which the vehicle travels, is represented at 12. The forward end of the shoe 12 is connected at one side thereof as indicated at 13 with a bar 14 pivotally connected by a pin 15 with the forward ends of a pair of links 16, the rear ends of which are pivotally connected by a pin 17 with lugs 18 extending forwardly from the periphery of a split collar 19 surrounding the sleeve member 8 and rigidly secured thereon as by a bolt 20 passing through the out-turned ends 21 of the split collar.

The shoe 12 toward its opposite end is connected at one side thereof as indicated at 22, with the outer end of a rod 23, which inclines rearwardly toward the median line of the vehicle and terminates in a deflected section 24 which has sliding fit in an opening in a boss 25 provided on a collar 26 secured to the sleeve 8. The deflected section 24 is provided at opposite sides of said boss with flanges 27 and 28, springs 29 and 30 encircling the bar section 24 being confined between these flanges and the ends of the boss 25, as represented. The shoe 12 is connected at a pivoted eye 31 on the upper end of the shoe, with a cable or other preferably flexible member 32 which extends forwardly and is connected, as indicated at 33 with a bracket 34 rigidly secured to the under side of one of the side members of the chassis. The shoe 12 which is thus adapted to swing by gravity to lowered position, is normally held in raised position by means of the pulley and cable mechanism of which the following is a description. Journaled in bearings 35 secured to the upper side of the chassis 6 (the bearing at one side only of the vehicle being shown), is a rotary shaft 36 which extends transversely of the vehicle. This shaft is equipped at opposite ends with pulleys 37 (one only of which is shown), on which a cable 38, secured at one end to the pulley, is wound, the lower end of this cable being equipped with a spiral spring 39 engaging an eye 40 provided on the rod 14. The shaft 36 also carries another, preferably smaller, pulley 41 on which a cable 42 having one end rigidly secured to this pulley, is wound, this cable extending forwardly and being pivotally connected, as indicated at 43, with the lower end of a lever 44, pivotally supported on the chassis, as indicated at 45, the upper end of this lever being equipped with a pawl 46 pivotally connected therewith and actuated to normally extend into, and interlock with the wall of, a slot 48 in a member 49 rigidly secured by the bolts 50 to the upper side of the chassis 6. The cable 38 is wound upon the pulley 37 in a clockwise direction in Fig. 1 and the cable 42 is wound upon the pulley 41 in an anti-clockwise direction, the parts described being so constructed and proportioned, as shown, as to cause the brake-shoe 12 to be in the position illustrated in full lines in Fig. 1 when the lever 44 is in the position shown in Fig. 5, namely in a position wherein the pawl 46 engages a wall of the slot 48, the weight of the several parts supported by the lever 44 in raised position as shown in the Fig. 1, being such that upon releasing the pawl 46 from the slot 48 the shoe 12 together with the parts connected therewith will, by gravity, swing to the lowered position represented by dotted lines in Fig. 1, swinging the lever 44 in a clockwise direction in Fig. 5, the movement of the shoe 12 when swinging to lowered position as stated being limited by the cable 32 which holds the shoe in braking position.

The brake-shoe 12 may be of any suitable form, it being preferred, however, that it be constructed of the form illustrated in the drawings in accordance with which it is provided along its inner face, namely, that face which opposes the tread of the tire 11 with an arc-shaped groove 51 adapting it to fit snugly against, and in conformance to, the section of tire which it opposes when the shoe is in braking position. The opposite face of the shoe is provided intermediate its ends with a rib or flange 52 which extends transversely of the shoe and serves to enhance the frictional resistance of the shoe on the pavement, and in the rear of this rib it is provided at opposite sides with laterally extending flanges 53 which extend from a point indicated at $x$ substantially to the point indicated at $y$, these edges being so formed, as shown, that they will grip the pavement and present the desired frictional resistance to forces tending to force the vehicle laterally, or, in other words, will resist forces tending to cause the vehicle to skid. Inasmuch as the shoe 12, when in braking position supports the weight which ordinarily is supported by the wheel, and the tread of the wheel is more or less flexible, namely, by being formed of a pneumatic tire 11, it is necessary, in order to relieve the connections for the shoe 12 of the relatively great stress which would be directed against them under the impact of the wheel in striking the brake-shoe as the latter moves to a position of interposition between the pavement and the wheel. This is accomplished in the construction illustrated by the double-jointed connection of the bar 14 with the sleeve 19 and also by the yielding connection of the rod 23 with the collar 26, whereby the means which pivotally support the shoe 12 are relieved of relatively great thrusts and thus may be constructed of comparatively light weight and are not subject to impairment.

The braking mechanism described is of particular use in case of emergency wherein it is desired to stop the vehicle as quickly as possible, the operation for effecting the movement of the braking-shoe 12 to braking position being very quickly performed inasmuch as all that is required to be done is to release the pull on the cable 42 whereupon the shoe and parts connected therewith drop into braking position.

As hereinbefore stated in practice, a braking mechanism, as described, would be provided for one wheel at each side of the vehicle to balance the forces exerted in braking. Thus there would be coöperatively related to the one of the pulleys 37 not shown, the same mechanism as coöperates with the illustrated pulley 37, whereby the control of each braking mechanism would be under the control of the one lever 44.

What I claim as new and desire to secure by Letters Patent is:—

1. The combination with a vehicle, of braking means for a wheel thereof comprising a shoe, a connector operatively engaging the said shoe and said vehicle and formed of sections two of which are connected with an intermediate section, by pivots, whereby said shoe is supported to swing from a position in advance of said wheel to a position in which it becomes interposed between the wheel and the pavement, means for limiting the rearward movement of said shoe relative to the wheel when in said interposed position, and means for normally holding said shoe in raised position.

2. The combination with a vehicle, of braking means for the wheel of the vehicle comprising a shoe, a connector operatively engaging said shoe and said vehicle and pivotally supporting said shoe in a position in advance of said wheel for movement to a position in which it becomes interposed between the wheel and the pavement, said connector being adapted to permit said shoe, when swung to said last referred to position, to yield upwardly at the said connector, a second connector operatively engaging said shoe at another point and flexibly connected with the vehicle, means for limiting rearward movement of said shoe relative to the wheel when in said interposed position, and means for normally holding said shoe in raised position.

3. The combination with a vehicle, of braking means for a wheel of the vehicle comprising a shoe, a connector operatively engaging said shoe and said vehicle and having a double-jointed section whereby said shoe is supported to swing from a position in advance of said wheel to a position in which it becomes interposed between the wheel and the pavement, a second connector operatively engaging said shoe at another point and flexibly connected with the vehicle, means for limiting rearward movement of said shoe relative to the wheel when in said interposed position, and means for normally holding said shoe in raised position.

4. The combination with a vehicle, of braking means for the wheel of the vehicle comprising a shoe, a connector operatively engaging said shoe and said vehicle and pivotally supporting said shoe in a position in advance of said wheel for movement to a position in which it becomes interposed between the wheel and the pavement, said connector being adapted to permit said shoe, when swung to said last referred to position, to yield upwardly at the said connector, a second connector operatively engaging said shoe at another point and extending toward the median line of the vehicle, a bearing in which the inner end of said second connector is slidably confined, means for limiting the rearward movement of said shoe relative to the wheel when in said interposed position, and means for normally holding said shoe in raised position.

5. The combination with a vehicle, of braking means for a wheel of the vehicle comprising a shoe, a connector operatively engaging said shoe and said vehicle and having a double-jointed section whereby said shoe is supported to swing from a position in advance of said wheel to a position in which it becomes interposed between the wheel and the pavement, a second connector operatively engaging said shoe at another point and extending toward the median line of the vehicle, a bearing in which the inner end of said second connector is slidably confined, means for limiting the rearward movement of said shoe relative to the wheel when in said interposed position, and means for normally holding said shoe in raised position.

6. The combination with a vehicle, of braking means for the wheel of the vehicle comprising a shoe, a connector operatively engaging said shoe and said vehicle and pivotally supporting said shoe in a position in advance of said wheel for movement to a position in which it becomes interposed between the wheel and the pavement, said connector being adapted to permit said shoe, when swung to said last referred to position, to yield upwardly at the said connector, a second connector operatively engaging said shoe at another point and extending toward the median line of the vehicle, a bearing in which the inner end of said second connector is slidably confined, springs coöperating with said second connector and said bearing for cushioning said connector in its bearing in either direction, means for limiting the rearward movement of said shoe relative to the wheel when in interposed position, and means for normally holding said shoe in raised position.

7. The combination with a vehicle, of braking means for a wheel of the vehicle comprising a shoe, a connector operatively engaging said shoe and said vehicle and having a double-jointed section whereby said shoe is supported to swing from a position in advance of said wheel to a position in which it becomes interposed between the wheel and the pavement, a second connector operatively engaging said shoe at another point and extending toward the median line of the vehicle, a bearing in which the inner end of said second connector is slidably confined, springs coöperating with said second connector and said bearing for cushioning said second connector in its movement in said bearing in either direction, means for limiting the rearward movement of said shoe relative to the wheel when in said interposed position, and means for normally holding said shoe in raised position.

8. The combination with a vehicle, of braking means for a wheel of the vehicle comprising a shoe, a pair of connectors operatively engaging said shoe toward its opposite ends, one of said connectors being connected with said vehicle and having a double-jointed section whereby said shoe is supported to swing from a position in advance of said wheel to a position in which it becomes interposed between the wheel and the pavement, said second connector extending rearwardly in an inclined direction and having a deflected end-portion, a bearing on said vehicle with which said deflected end slidingly engages, spring means tending to maintain said deflected end-portion in centralized position in said bearing, a cable connected with said shoe and with said vehicle and operating to limit rearward movement of said shoe relative to the vehicle when the shoe is in said interposed position, a shaft journaled on the vehicle to extend transversely thereof, pulleys secured to said shaft, a cable extending about one of said pulleys and connected with one of said connectors, a cable extending in wound condition about the other of said pulleys when said shoe is in braking position, and means connected with said second-named cable operating when actuated to rotate said shaft and wind said first-referred to cable upon its pulley.

9. A brake-shoe for the purpose set forth, formed along its lateral edges with flanges extending substantially lengthwise of the shoe and adapted to frictionally engage the pavement and prevent skidding, and a transversely-disposed rib on said shoe in advance of said flanges for augmenting resistance between the shoe and the pavement in the longitudinal movement of the shoe along the pavement.

CARL LEO BRUUN.

In presence of—
 A. C. FISCHER,
 K. O'NEILL.

Copies of this patent may be obtained for five cents each, by addressing the "Commissioner of Patents, Washington, D. C."